(12) United States Patent
Tseng et al.

(10) Patent No.: US 12,096,172 B2
(45) Date of Patent: Sep. 17, 2024

(54) HEADPHONE

(71) Applicant: Cheng Uei Precision Industry Co., LTD., New Taipei (TW)

(72) Inventors: Chi-Ming Tseng, New Taipei (TW); Chin-Chung Lin, New Taipei (TW)

(73) Assignee: CHENG UEI PRECISION INDUSTRY CO., LTD., New Taipei (TW)

(*) Notice: Subject to any disclaimer, the term of this patent is extended or adjusted under 35 U.S.C. 154(b) by 223 days.

(21) Appl. No.: 17/902,771

(22) Filed: Sep. 2, 2022

(65) Prior Publication Data

US 2023/0179900 A1  Jun. 8, 2023

(30) Foreign Application Priority Data

Dec. 6, 2021 (CN) .......................... 202123047165.9

(51) Int. Cl.
*H04R 1/10* (2006.01)
*F21V 8/00* (2006.01)
*F21V 33/00* (2006.01)

(52) U.S. Cl.
CPC ....... *H04R 1/1008* (2013.01); *F21V 33/0056* (2013.01); *G02B 6/0055* (2013.01); *G02B 6/0088* (2013.01); *H04R 1/105* (2013.01); *H04R 1/1066* (2013.01)

(58) Field of Classification Search
CPC .. G02B 6/0045; G02B 6/0055; G02B 6/0088; G02B 6/0001; H04R 1/1008; H04R 1/1091; H04R 1/1066; H04R 5/033; H04R 5/0335; H04R 1/105; H04R 1/1058; F21V 33/0056; F21V 5/008; F21V 7/04; F21V 7/0025; F21V 2200/00
See application file for complete search history.

(56) References Cited

U.S. PATENT DOCUMENTS

| | | | |
|---|---|---|---|
| 7,377,666 B1 * | 5/2008 | Tyler | A61F 11/14 362/311.06 |
| 10,344,963 B1 * | 7/2019 | Mobed | H04R 1/028 |
| 2014/0259287 A1 * | 9/2014 | Waters | A41D 13/0002 2/209 |

* cited by examiner

*Primary Examiner* — Carolyn R Edwards
*Assistant Examiner* — Julie X Dang
(74) *Attorney, Agent, or Firm* — Cheng-Ju Chiang

(57) ABSTRACT

A headphone includes an arc-shaped headband, a sliding bar slidably arranged at a tail end of the headband, a hanger pivotally arranged at a tail end of the sliding bar, an earphone unit hanged to the hanger, and a light emitting unit. The earphone unit is fastened to the hanger. The earphone unit includes a housing. A peripheral edge of an outer surface of the housing protrudes outward to form a protruding ring. The light emitting unit is fastened to the housing. The light emitting unit includes a light guiding module and a light emitter. The light guiding module includes a light guider and a light blocker. An inner end of the light blocker is provided with a contacting portion which is closely cooperated with the protruding ring, and an inner end of the light guider closely abuts against the protruding ring.

15 Claims, 10 Drawing Sheets

HEADPHONE

CROSS-REFERENCE TO RELATED APPLICATION

The present application is based on, and claims priority from, China Patent Application No. 202123047165.9, filed Dec. 6, 2021, the disclosure of which is hereby incorporated by reference herein in its entirety.

BACKGROUND OF THE INVENTION

1. Field of the Invention

The present invention generally relates to a headphone, and more particularly to a headphone with a light-emitting function.

2. The Related Art

Generally, when a headphone is compared with an in-ear earphone, a wearing comfortableness of the headphone is better than a wearing comfortableness of the in-ear earphone in use. The headphone is able to be worn for longer time, and an effect of isolating an environment background noise of the headphone is better, the headphone is loved by many music lovers.

In order to improve a market competitiveness of the headphone and gain favors of more consumers, a body of the headphone is equipped with a luminous decoration cover for creating a luminous effect on the body of the headphone. However, the luminous effect of the luminous decoration cover is often unideal, for example, a luminous brightness is without an enough concentration. The luminous decoration cover is made of a plastic material. The luminous decoration cover is formed by an injection molding technology. A surface of the luminous decoration cover contacts with a surface of the body of the headphone. The surfaces of the luminous decoration cover and the body of the headphone are planes. The luminous decoration cover and the body of the headphone are combined without a tightness. Light rays are able to emitted from the surface of the luminous decoration cover, consequently, a light shielding performance of the luminous decoration cover is poor. The light rays from the luminous decoration cover are transmitted out of the body of the headphone. A poor visual effect of the headphone is often generated by people.

Therefore, it is necessary to provide a headphone with a light-emitting function and a better sealing performance.

SUMMARY OF THE INVENTION

An object of the present invention is to provide a headphone. The headphone includes an arc-shaped headband, a sliding bar slidably arranged at a tail end of the headband, a hanger pivotally arranged at a tail end of the sliding bar, an earphone unit hanged to the hanger, and a light emitting unit. The earphone unit is fastened to the hanger. The earphone unit includes a housing, a sound chamber formed in the housing, a loudspeaker monomer mounted in the sound chamber, and a rigid printed circuit board mounted in the sound chamber. The rigid printed circuit board is connected with the loudspeaker monomer. A peripheral edge of an outer surface of the housing protrudes outward to form a protruding ring. The light emitting unit is fastened to the housing of the earphone unit. The light emitting unit includes a light guiding module fastened to the housing, and a light emitter electrically connected to the rigid printed circuit board. The light guiding module includes a light guider which is mounted close to an outer surface of the light emitter, and a light blocker mounted to a periphery of an outer surface of the light guider. The light blocker is formed at an outer periphery of the light guiding module by an embedded injection molding technology. An inner end of the light blocker is provided with a contacting portion which is closely cooperated with the protruding ring, and an inner end of the light guider closely abuts against the protruding ring. Light rays from the light emitter are blocked, so the light rays from the light emitter are prevented from leaking. An outer surface of the protruding ring slantwise extends outward and away from the light guiding module to form an oblique surface. An innermost surface of the contacting portion of the light blocker is a circular wedging surface. The wedging surface is inclined inward from an inner edge of the wedging surface to an outer edge of the wedging surface. The wedging surface abuts against the oblique surface of the protruding ring.

Another object of the present invention is to provide a headphone. The headphone includes a headband, a hanger arranged at a tail end of the headband, an earphone unit hanged to the hanger, and a light emitting unit. The earphone unit is fastened to the hanger. The earphone unit includes a housing, a sound chamber formed in the housing, a loudspeaker monomer mounted in the sound chamber, and a rigid printed circuit board mounted in the sound chamber. The rigid printed circuit board is connected with the loudspeaker monomer. The light emitting unit is fastened to the housing. The light emitting unit includes a light guiding module fastened to the housing, and a light emitter electrically connected to the rigid printed circuit board. The light guiding module includes a light guider which is mounted close to an outer surface of the light emitter, and a light blocker mounted to a periphery of an outer surface of the light guider. The light guider has a guiding plate, and a guiding wall mounted around a peripheral edge of the guiding plate. The guiding wall is arched outward and extends towards the housing. An inner surface of the guiding plate has a collecting surface, a circumferential surface surrounding a periphery of the collecting surface, and a refraction bevel connected with an outer periphery of the circumferential surface. A middle of the inner surface of the guiding plate is recessed opposite to the housing to form the collecting surface. The light emitter is corresponding to the collecting surface. The refraction bevel slantwise extends outward from the outer periphery of the circumferential surface. A minimum distance between an outer surface of the guiding plate and the circumferential surface is larger than a minimum distance between the outer surface of the guiding plate and the refraction bevel. The minimum distance between the outer surface of the guiding plate and the refraction bevel is larger than a minimum distance between the outer surface of the guiding plate and the collecting surface.

Another object of the present invention is to provide a headphone. The headphone includes an arc-shaped headband, a sliding bar slidably arranged at a tail end of the headband, a hanger pivotally arranged at a tail end of the sliding bar, an earphone unit hanged to the hanger, and a light emitting unit. The earphone unit is fastened to the hanger. The earphone unit includes a housing, a sound chamber formed in the housing, a loudspeaker monomer mounted in the sound chamber, and a rigid printed circuit board mounted in the sound chamber. The rigid printed circuit board is connected with the loudspeaker monomer. A peripheral edge of a top end of an outer surface of the housing protrudes outward to form a protruding ring. The light emitting unit is fastened to the housing. The light emitting unit includes a light guiding module fastened to the housing, and a light emitter electrically connected to the rigid printed circuit board. The light guiding module includes a light guider which is mounted close to an outer surface of the light emitter, and a light blocker mounted to a periphery of an outer surface of the light guider. An inner end of the light blocker is provided with a contacting portion which is closely cooperated with the protruding ring, and an inner end of the light guider closely abuts against the protruding ring. An outer surface of the protruding ring slantwise extends outward and away from the light guiding module to form an oblique surface. The light guider has a circular guiding plate, and an annular guiding wall mounted around a peripheral edge of the guiding plate. An innermost surface of the guiding wall is a circular inclination surface, and the inclination surface of the guiding wall is inclined inward from an inner edge of the inclination surface to an outer edge of the inclination surface. The inclination surface of the guiding wall of the light guider is matched with the oblique surface of the protruding ring. The inclination surface of the guiding wall of the light guider is closely attached with the oblique surface of the protruding ring. An innermost surface of the contacting portion is a circular wedging surface. The wedging surface is inclined inward from an inner edge of the wedging surface to an outer edge of the wedging surface. The wedging surface abuts against the oblique surface of the protruding ring. Light rays from the light emitter are blocked, so the light rays from the light emitter are prevented from leaking.

As described above, the light rays emitted by the light emitter are concentrated by the collecting surface, and the concentrated light rays are transmitted to a first reflector, then the first reflector reflects the concentrated light rays to the guiding plate, and the reflected light rays are guided to a protruding rib by the refraction bevel to light up the protruding rib. In order to reflect light sources which are scattered onto an outer surface of an outer housing back to the light guider to brighten a luminance of the protruding rib, the light emitting unit includes a second reflector, the second reflector and the light emitter are disposed at the same plane. Furthermore, the light blocker is mounted around a peripheral surface of the guiding wall, an inner end of the contacting portion covers an inner end of the guiding wall, the inclination surface of the guiding wall of the light guider is closely attached with the oblique surface of the protruding ring, the wedging surface abuts against the oblique surface of the protruding ring, and the wedging surface is closely cooperated with the oblique surface of the protruding ring, so the light guiding module of the light emitting unit is completely closed, the light rays from the light emitter are effectively blocked to prevent the light rays from leaking out. As a result, the headphone is with a light-emitting function and a better sealing performance.

BRIEF DESCRIPTION OF THE DRAWINGS

The present invention will be apparent to those skilled in the art by reading the following description, with reference to the attached drawings, in which.

DETAILED DESCRIPTION OF THE PREFERRED EMBODIMENT

Figure 1:
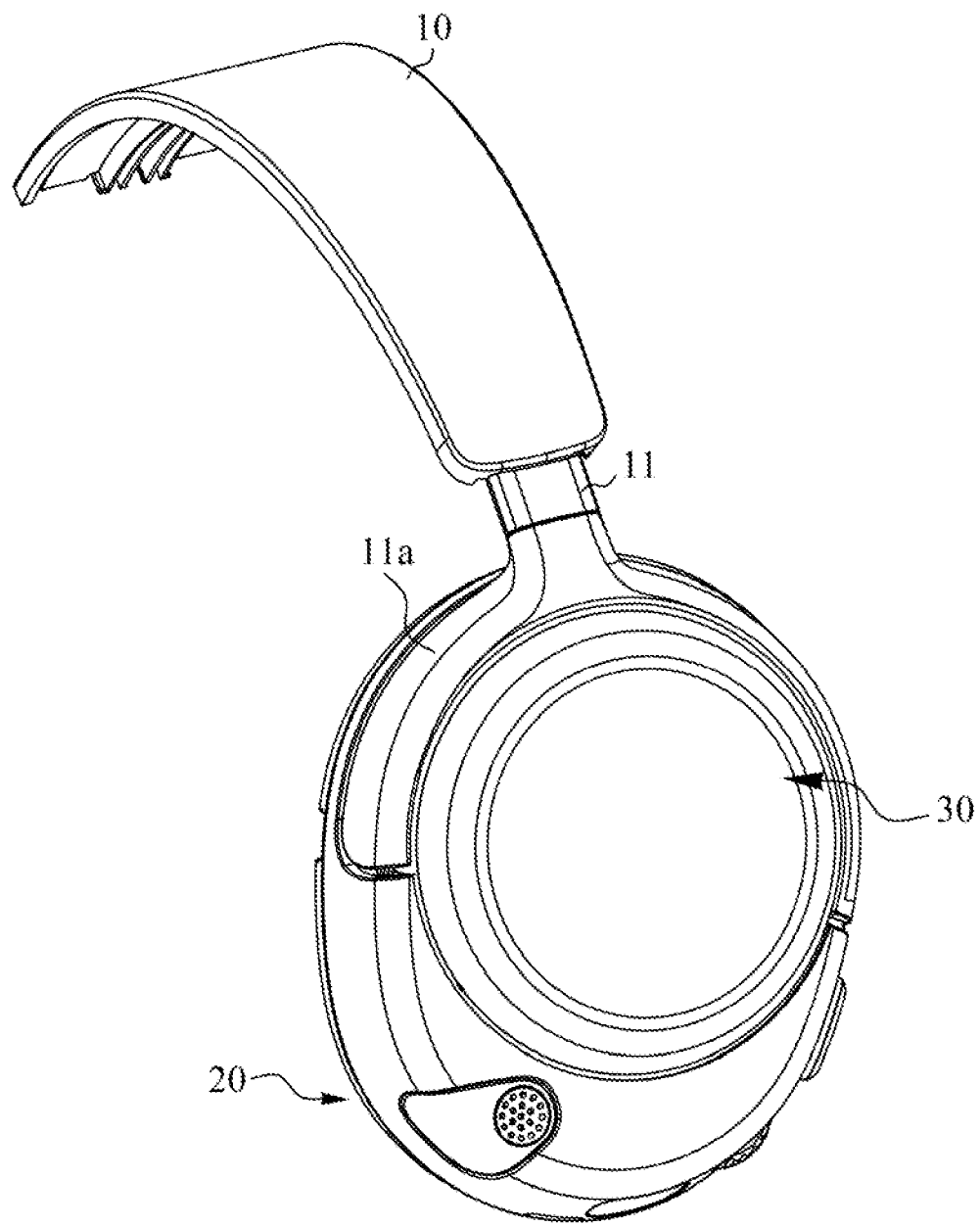
FIG. 1 is a perspective view of a headphone according to a preferred embodiment of the present invention.
Figure 2:
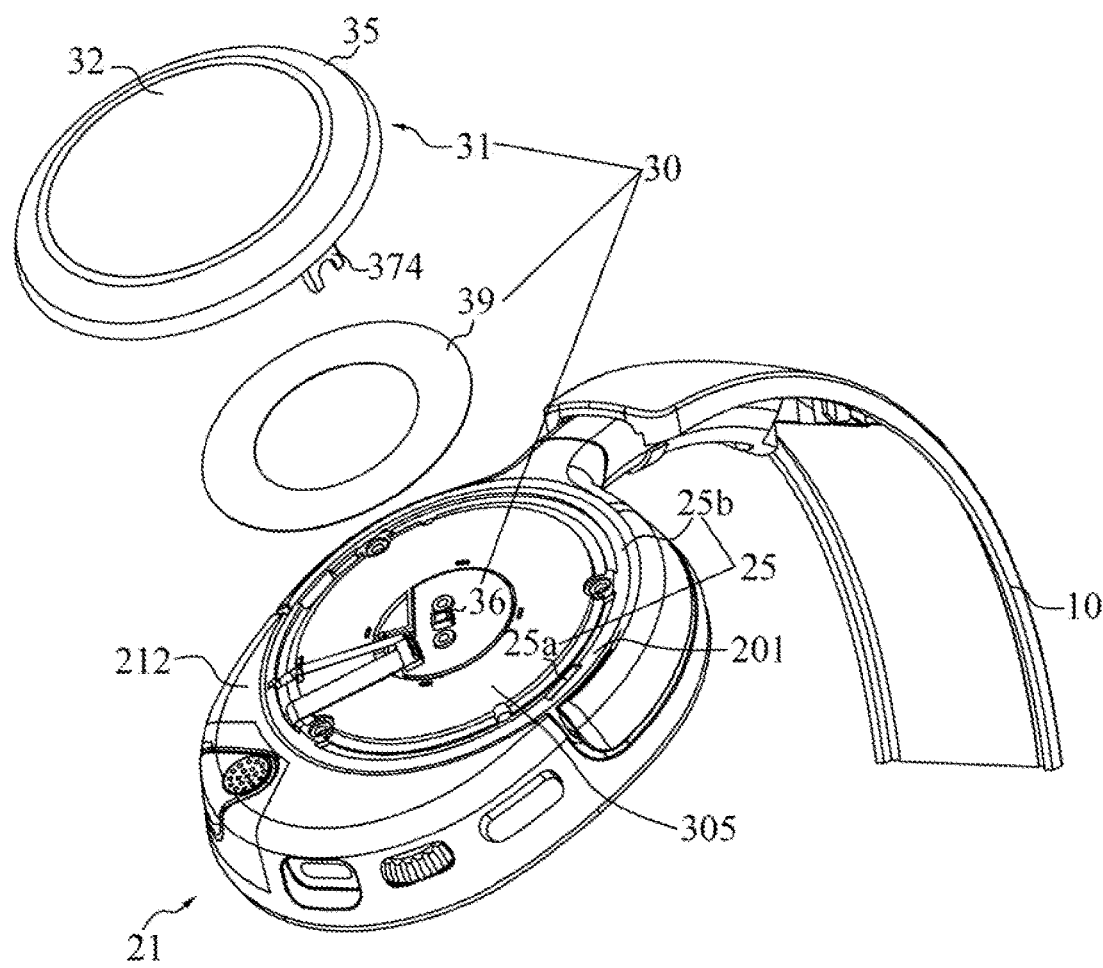
FIG. 2 is an exploded view of the headphone of FIG. 1.

Referring to FIG. 1 and FIG. 2, a headphone 100 in accordance with a preferred embodiment of the present invention is shown. The headphone 100 includes an arc-shaped headband 10, a sliding bar 11 which is slidably arranged at a tail end of the headband 10, a hanger 11a pivotally arranged at a tail end of the sliding bar 11, an earphone unit 20 hanged to the hanger 11a, and a light emitting unit 30 fastened to the earphone unit 20. The hanger 11a is arranged at the tail end of the headband 10. Two sides of the hanger 11a are bent downward and outward to make the hanger 11a form a C shape. The two sides of the hanger 11a are symmetrical to each other with respect to the sliding bar 11.

Figure 3:
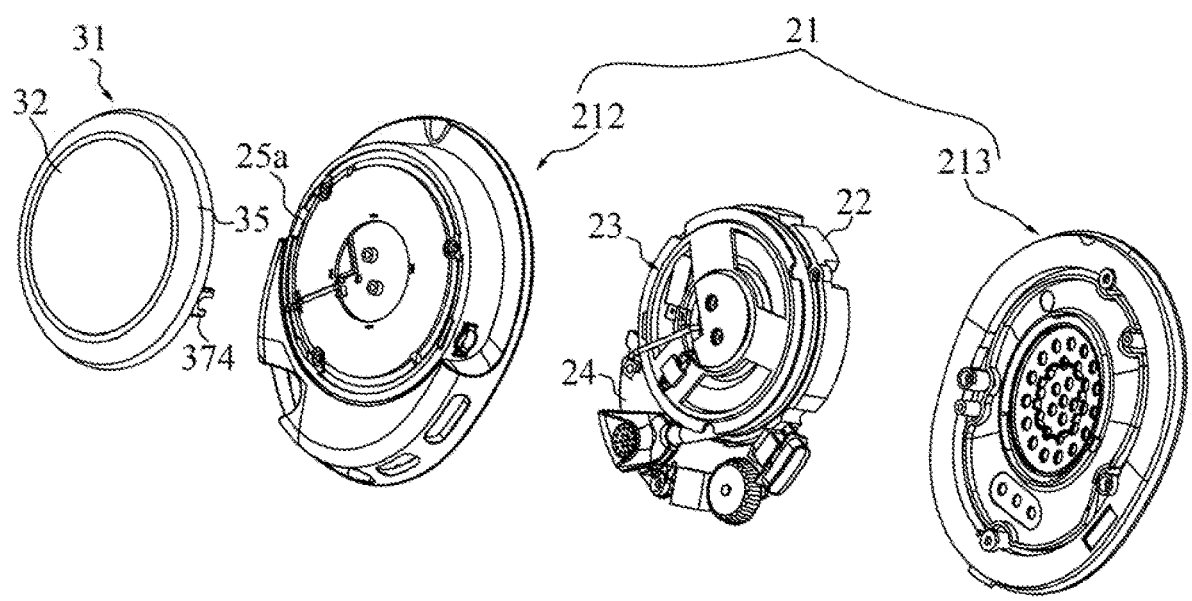
FIG. 3 is an exploded view of an earphone unit and a light emitting unit of the headphone of FIG. 2.
Figure 4:
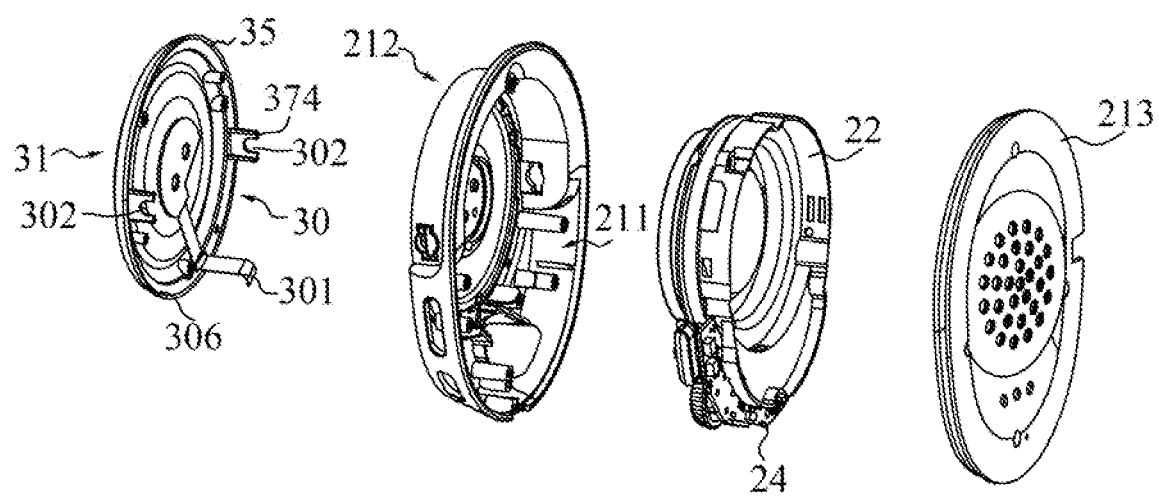
FIG. 4 is another exploded view of the earphone unit and the light emitting unit of the headphone of FIG. 2.

Referring to FIG. 2, FIG. 3 and FIG. 4, the earphone unit 20 is fastened to the hanger 11a. The earphone unit 20 includes a housing 21, a sound chamber 211 formed in the housing 21, a loudspeaker monomer 22 mounted in the sound chamber 211, a microphone assembly 23 disposed on a surface of the loudspeaker monomer 22, and a rigid printed circuit board 24 mounted in the sound chamber 211. The rigid printed circuit board 24 is connected with the loudspeaker monomer 22 and the microphone assembly 23.

The housing 21 includes an outer housing 212, and an inner housing 213 assembled with the outer housing 212. The outer housing 212 has a fixing structure 25 arranged on an outer surface of the outer housing 212. In order to describe more clearly, an outer surface of the inner housing 213 is attached to an ear of a user tightly, and the outer surface of the outer housing 212 is opposite to the outer surface of the inner housing 213.

Referring to FIG. 2 to FIG. 5, the fixing structure 25 is a circular ring shape. The fixing structure 25 slightly projects beyond the outer surface of the outer housing 212. Two sides of the fixing structure 25 has two securing recesses 25a longitudinally penetrating through the two sides of the fixing structure 25 and the outer housing 212. The two securing recesses 25a are communicated between the sound chamber 211 and an outside. The two securing recesses 25a are opposite to each other.

The light emitting unit 30 is fastened to the outer housing 212 of the housing 21 of the earphone unit 20. The light emitting unit 30 includes a light guiding module 31 fastened to the outer housing 212 of the housing 21, and a light emitter 36 arranged between the light guiding module 31 and the outer surface of the outer housing 212. The light guiding module 31 is cooperated with the fixing structure 25. The light guiding module 31 is assembled with the fixing structure 25. The light emitter 36 is electrically connected to the rigid printed circuit board 24 through a flexible printed circuit board 301. A light path of the light guiding module 31 of the headphone 100 is shown in FIG. 2. The light guiding module 31 of the light emitting unit 30 includes a light guider 37 which is mounted close to an outer surface of the light emitter 36, a light blocking sheet 32 disposed to an outer surface of the light guider 37, and a ring-shaped light blocker 35 mounted to a periphery of the outer surface of the light guider 37.

The light guider 37 is mounted between the light blocking sheet 32 and the light emitter 36. The light blocker 35 is formed at an outer periphery of the light guiding module 31 by an embedded injection molding technology. An outer periphery of the light blocking sheet 32 is spaced from an inner periphery of the light blocker 35 to form a light transmitting window 38 between the outer periphery of the light blocking sheet 32 and the inner periphery of the light blocker 35. The light transmitting window 38 isolates the outer periphery of the light blocking sheet 32 and the inner periphery of the light blocker 35. The light transmitting window 38 presents a preset pattern, so that light rays emitted from the light emitter 36 presents the preset pattern through the light transmitting window 38.

Referring to FIG. 2 to FIG. 5, in order to ensure that the light rays emitted by the light emitter 36 pass through the light transmitting window 38 evenly, the light guider 37 has a circular guiding plate 371, an annular guiding wall 372 mounted around a peripheral edge of the guiding plate 371, a protruding rib 373 protruded outward from the peripheral edge of the guiding plate 371, and two limiting blocks 374 protruded inward from two sides of an inner surface of the guiding wall 372. The guiding wall 372 is arched outward and extends towards the outer surface of the outer housing 212 of the housing 21. The protruding rib 373 is matched with the light transmitting window 38. The protruding rib 373 is embedded into the light transmitting window 38. The two limiting blocks 374 are protruded towards the outer surface of the outer housing 212. Middles of two free ends of the two limiting blocks 374 are recessed opposite to the outer surface of the outer housing 212 to form two lacking grooves 302. One side of an outer surface of the guiding plate 371 protrudes outward to form a buckling portion 303. The two limiting blocks 374 are corresponding to the two securing recesses 25a. The two limiting blocks 374 are fastened in the two securing recesses 25a, so that the light guiding module 31 is fastened to the outer surface of the outer housing 212. In this preferred embodiment, the light emitter 36 is a LED (Light Emitting Diode) lamp.

Figure 5:
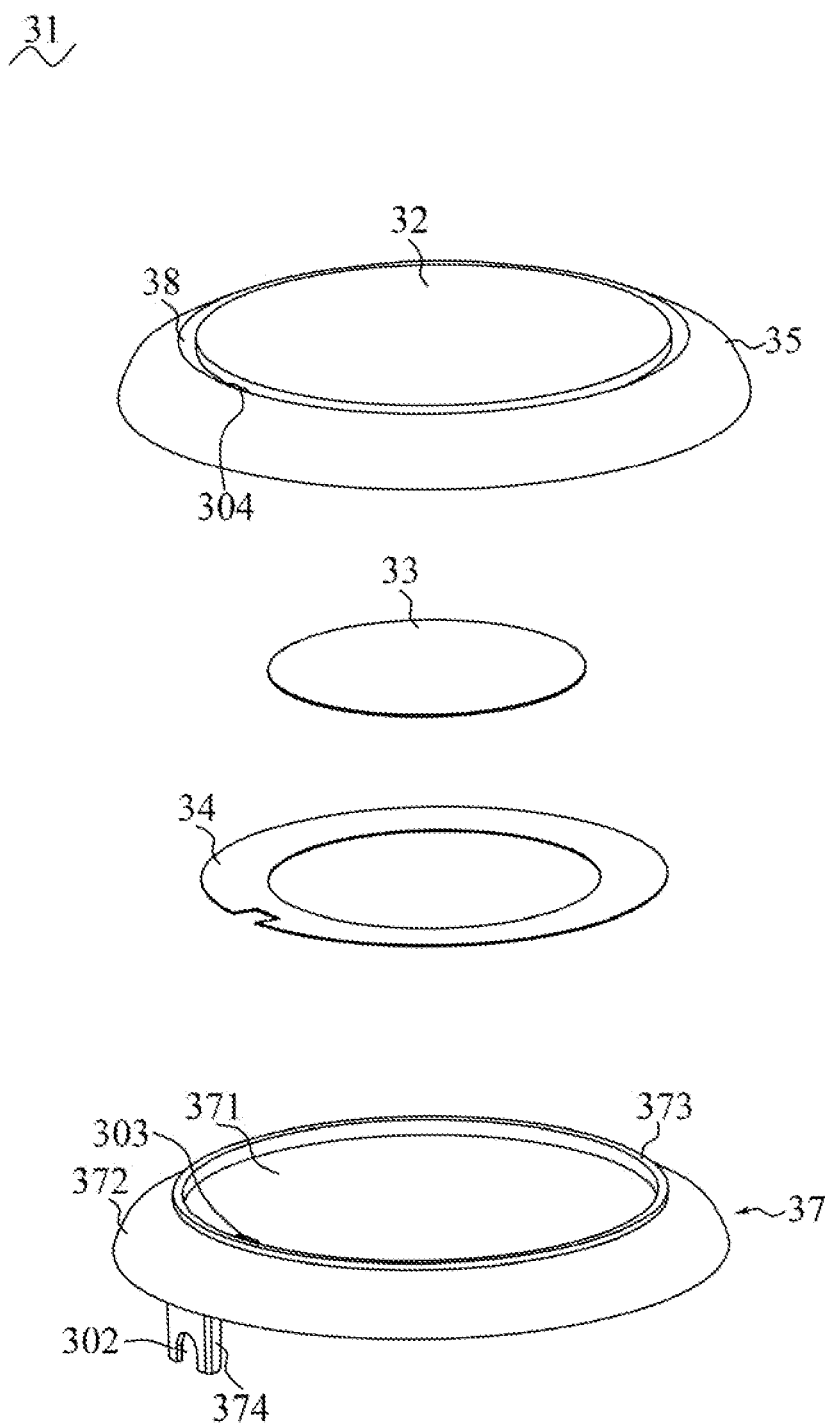
FIG. 5 is an exploded view of a light guiding module of the headphone of FIG. 2.
Figure 6:
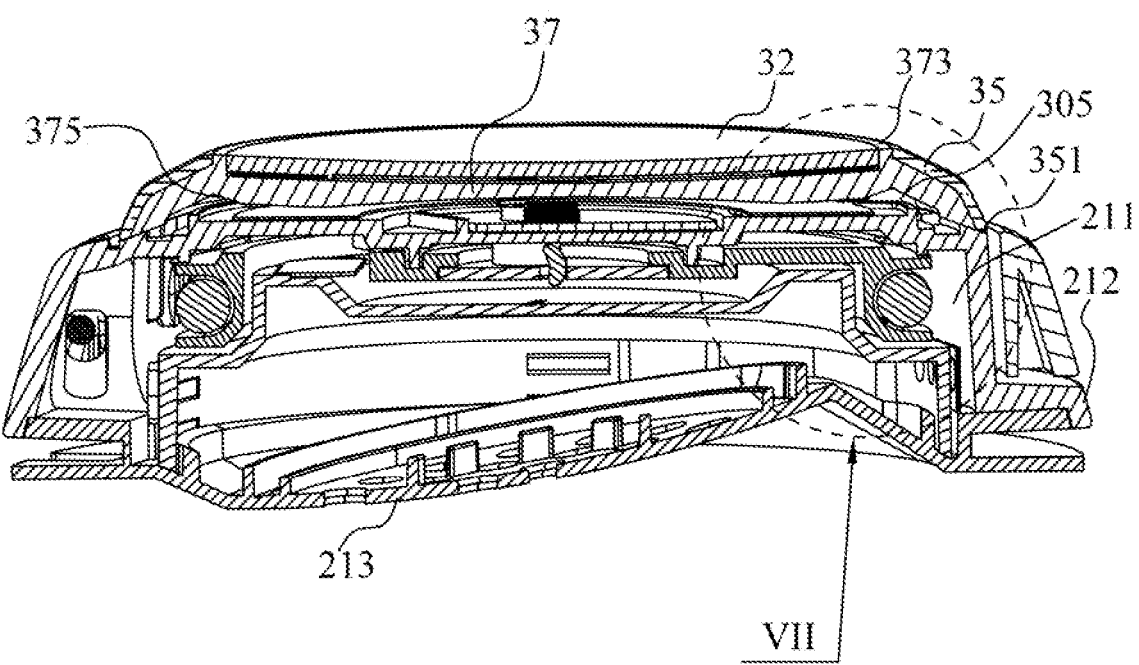
FIG. 6 is a sectional view of the earphone unit and the light emitting unit of the headphone of FIG. 2.
Figure 8:
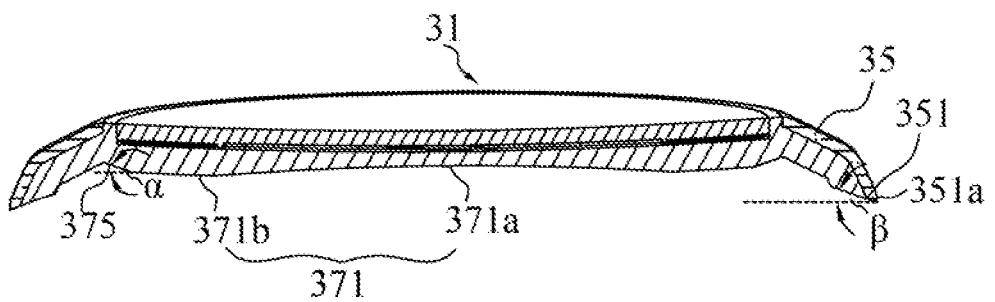
FIG. 8 is a sectional view of the light guiding module of the headphone of FIG. 2.
Figure 9:
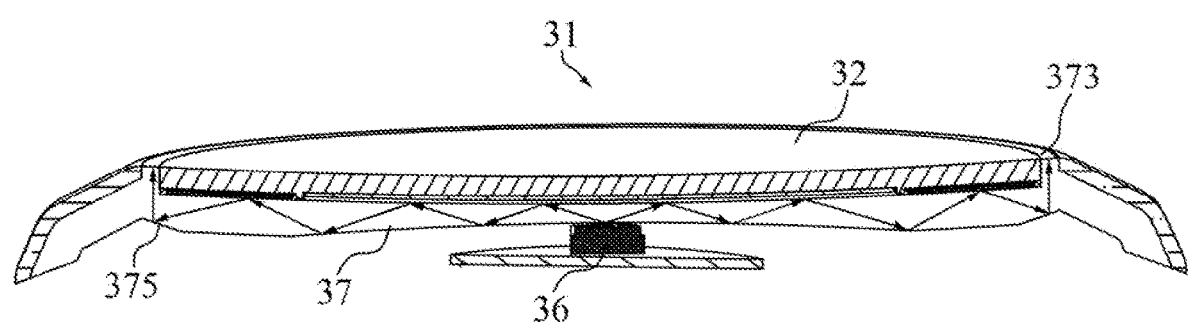
FIG. 9 is a schematic diagram that shows a light path of the light guiding module of the headphone of FIG. 2.

Referring to FIG. 5, FIG. 8 and FIG. 9, in order to further ensure that the light rays emitted from the light emitter 36 is effectively refracted to be guided to the protruding rib 373 to light up the protruding rib 373. The light emitting unit 30 further includes a first reflector 33 mounted between the guiding plate 371 of the light guider 37 and the light blocking sheet 32. The outer surface of the guiding plate 371 is recessed inward and towards the outer housing 212. An inner surface of the guiding plate 371 has a collecting surface 371a, a circumferential surface 371b surrounding a periphery of the collecting surface 371a, and a refraction bevel 375 connected with an outer periphery of the circumferential surface 371b. A middle of the inner surface of the guiding plate 371 is recessed opposite to the outer surface of the outer housing 212 of the housing 21 to form the collecting surface 371a. The collecting surface 371a is recessed towards the light blocking sheet 32. A curvature radius of the collecting surface 371a is larger than a curvature radius of the outer surface of the guiding plate 371. The light emitter 36 is corresponding to the collecting surface 371a. The light emitter 36 is corresponding to a center of the collecting surface 371a. The collecting surface 371a is opposite to the light blocking sheet 32 and the first reflector 33. The refraction bevel 375 slantwise extends outward from the outer periphery of the circumferential surface 371b. The refraction bevel 375 is inclined outward and towards an extending direction of the protruding rib 373. The refraction bevel 375 is opposite to the protruding rib 373. A minimum distance between the outer surface of the guiding plate 371 and the collecting surface 371a is defined as D1. A minimum distance between the outer surface of the guiding plate 371 and the circumferential surface 371b is defined as D2. A minimum distance between the outer surface of the guiding plate 371 and the refraction bevel 375 is defined as D3. In the preferred embodiment, the minimum distance between the outer surface of the guiding plate 371 and the circumferential surface 371b is larger than the minimum distance between the outer surface of the guiding plate 371 and the refraction bevel 375. The minimum distance between the outer surface of the guiding plate 371 and the refraction bevel 375 is larger than the minimum distance between the outer surface of the guiding plate 371 and the collecting surface 371a. A following condition is satisfied: D2>D3>D1.

A middle of the outer surface of the guiding plate 371 is corresponding to the first reflector 33. The first reflector 33 is mounted on the middle of the outer surface of the guiding plate 371. One side of an inner surface of the light blocking sheet 32 is recessed opposite to the light guider 37 to form a buckling groove 304. The buckling portion 303 of the guiding plate 371 is buckled in the buckling groove 304 of the light blocking sheet 32, so the first reflector 33 is buckled between the light blocking sheet 32 and the guiding plate 371 of the light guider 37. The light blocking sheet 32 is adhered to the outer surface of the guiding plate 371 by a double-sided adhesive 34. The double-sided adhesive 34 is disposed around the first reflector 33. The buckling portion 303 and the buckling groove 304 are exposed from one side of the double-sided adhesive 34. The first reflector 33 is fastened between the light blocking sheet 32 and the guiding plate 371 of the light guider 37.

Figure 7:
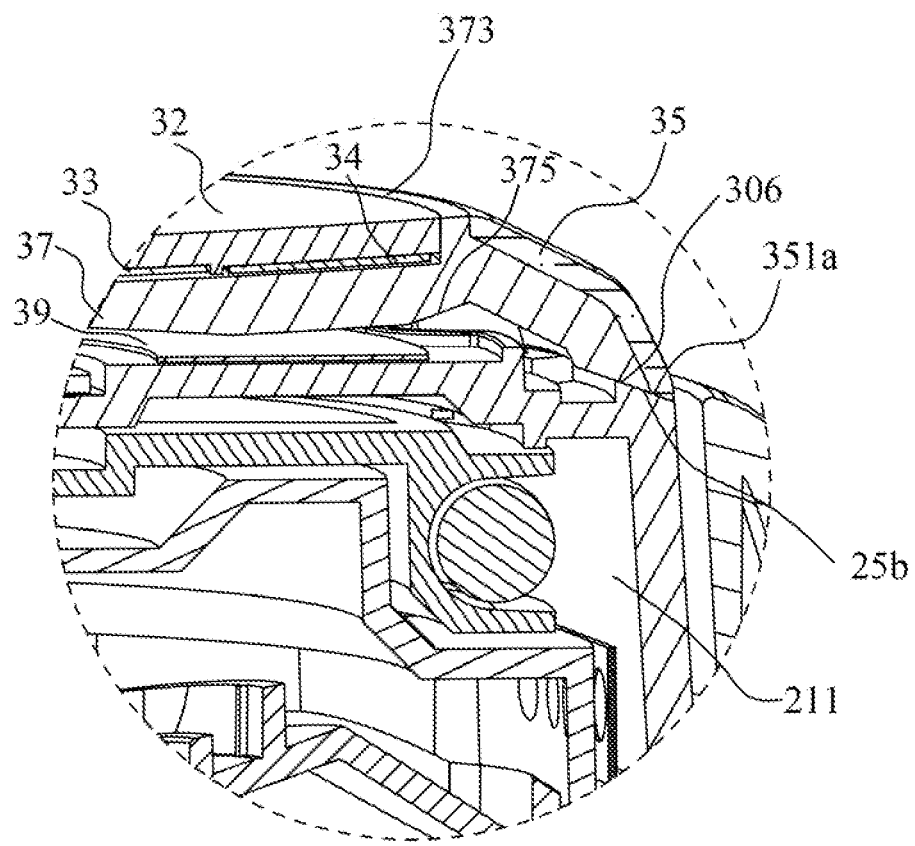
FIG. 7 is an enlarged view of an encircled portion VII of the headphone of FIG. 6.

Referring to FIG. 7 and FIG. 8, the light rays emitted by the light emitter 36 are concentrated by the collecting surface 371a, and the concentrated light rays are transmitted to the first reflector 33, then the first reflector 33 reflects the concentrated light rays to the guiding plate 371, and the reflected light rays are guided to the protruding rib 373 by the refraction bevel 375 to light up the protruding rib 373. Simultaneously, the collecting surface 371a is recessed along a direction from the inner surface of the guiding plate 371 to the outer surface of the guiding plate 371, a space is formed between the collecting surface 371a and the outer housing 212 to ensure that the light rays emitted by the light emitter 36 enter the collecting surface 371a of the guiding plate 371.

In order to guide the light rays to the protruding rib 373 more effectively, a bevel angle α of the refraction bevel 375 is formed between the refraction bevel 375 and an extension line of the circumferential surface 371b. The bevel angle α of the refraction bevel 375 is designed in a range of more than twenty degrees and less than thirty degrees. The light guider 37 is made of a polycarbonate material which is added with a certain proportion of light diffusing agents and titanium dioxide. A proportion of the titanium dioxide is ranged from more than 0.003% to less than 0.005%, and a proportion of the light diffusing agents are ranged from more than 0.32% to less than 0.45%, so that the light rays are evenly diffused in the reflecting process and the refracting process, and the light rays are guided to a surface of the protruding rib 373. The light blocking sheet 32 is made of silicone. The light blocking sheet 32 has a better light shielding characteristic. The light blocking sheet 32 effectively shields the light rays to make the light rays concentrated to glow through the protruding rib 373.

Figure 10:
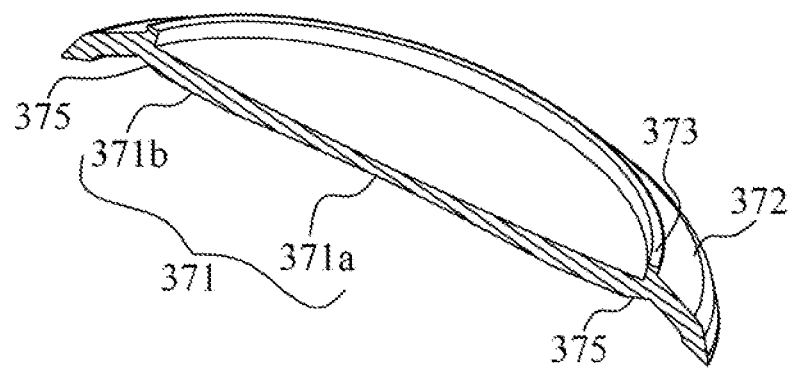
FIG. 10 is a sectional view of a light guider of the light guiding module of FIG. 2.

Referring to FIG. 2, FIG. 9 and FIG. 10, the light guider 37 is transparent milky white. Some light sources are refracted to leave the light guider 37, and the refracted light sources are scattered onto the outer surface of the outer housing 212 by the light guider 37. In order to reflect the light sources which are scattered onto the outer surface of the outer housing 212 back to the light guider 37 to brighten a luminance of the protruding rib 373. The light emitting unit 30 includes a second reflector 39. The second reflector 39 is mounted between the light guider 37 and the outer housing 212. The second reflector 39 is formed in a ring shape, and the second reflector 39 is annularly fixed to the outer surface of the outer housing 212. The second reflector 39 and the light emitter 36 are disposed at the same plane, and the second reflector 39 is corresponding to the circumferential surface 371b. The second reflector 39 and the light emitter 36 are disposed at the outer surface of the outer housing 212. The second reflector 39 reflects the light rays which are scattered onto the outer surface of the outer housing 212 back to the light guider 37, and then the light rays are guided to the protruding rib 373 through the refraction bevel 375 to brighten the luminance of the protruding rib 373.

Referring to FIG. 1 to FIG. 10, in order to prevent the light rays emitted by the light emitter 36 leaking from a seam 305 between the outer periphery of the light guiding module 31 and the outer surface of the outer housing 212, the fixing structure 25 includes a protruding ring 25b. A peripheral edge of an outer surface of the housing 21 protrudes outward to form the protruding ring 25b. A peripheral edge of the outer surface of the outer housing 212 protrudes outward to form the protruding ring 25b. The protruding ring 25b projects beyond the outer surface of the outer housing 212. An outer surface of the protruding ring 25b is an oblique surface 201. The outer surface of the protruding ring 25b slantwise extends outward and away from the light guiding module 31 to form the oblique surface 201. The oblique surface 201 is gradually inclined inward from an inner edge of the protruding ring 25b to an outer edge of the protruding ring 25b, so the seam 305 between the outer housing 212 and the light emitting unit 30 is misaligned with the light rays from the light emitter 36 to avoid the light rays overflowing through the seam 305. An inclined direction of the oblique surface 201 of the protruding ring 25b is without being limited to be inclined inward from the inner ring of the protruding ring 25b to the outer ring of the protruding ring 25b, in another preferred embodiment, the oblique surface 201 of the protruding ring 25b is inclined outward from the inner ring of the protruding ring 25b to the outer ring of the protruding ring 25b.

The light blocker 35 is mounted around a peripheral surface of the guiding wall 372. The light blocker 35 is molded around the peripheral surface of the guiding wall 372. The guiding wall 372 is inserted in the light blocker 35. An outermost surface of the light blocker 35 is aligned with an outer surface of the protruding rib 373. An inner end of the light blocker 35 is provided with a contacting portion 351 which is closely cooperated with the protruding ring 25b, and an inner end of the light guider 37 closely abuts against the protruding ring 25b, the light rays from the light emitter 36 are blocked, so the light rays from the light emitter 36 are prevented from leaking. An inner end of the contacting portion 351 covers an inner end of the guiding wall 372. An innermost surface of the guiding wall 372 is a circular inclination surface 306, and the inclination surface 306 of the guiding wall 372 is inclined inward from an inner edge of the inclination surface 306 to an outer edge of the inclination surface 306. The inclination surface 306 of the guiding wall 372 of the light guider 37 is matched with the oblique surface 201 of the protruding ring 25b. An innermost surface of the contacting portion 351 of the light blocker 35 is a circular wedging surface 351a. The wedging surface 351a is inclined inward from an inner edge of the wedging surface 351a to an outer edge of the wedging surface 351a. The wedging surface 351a is arranged corresponding to the oblique surface 201 of the protruding ring 25b, and the wedging surface 351a is closely cooperated with the oblique surface 201 of the protruding ring 25b.

The light emitter 36 is covered between the light guider 37 and the outer surface of the outer housing 212, the oblique surface 201 is gradually inclined inward from the inner edge of the protruding ring 25b to the outer edge of the protruding ring 25b, the inclination surface 306 of the guiding wall 372 of the light guider 37 is closely attached with the oblique surface 201 of the protruding ring 25b of the outer housing 212, and the wedging surface 351a abuts against the oblique surface 201 of the protruding ring 25b of the outer housing 212, so the light guiding module 31 of the light emitting unit 30 is completely closed, and the light rays from the light emitter 36 are effectively blocked to prevent the light rays from leaking out. The light blocker 35 and the light guider 37 are formed by a double injection molding technology. The light blocker 35 is made of a thermoplastic polyurethane elastomer rubber, so the light blocker 35 has a better light-shielding performance for preventing a leakage of the light rays, and a luminous stereoperception of the protruding rib 373 is enhanced. An inclination angle β of the inclination surface 306 is formed between a horizontal line and the inclination surface 306. The inclination angle β of the inclination surface 306 is designed in a range of more than twenty degrees and less than twenty-five degrees (shown in FIG. 8). If the inclination angle β of the inclination surface 306 is overly large, an innermost angel of the guiding wall 372 of the light guider 37 and an innermost angel of the light blocker 35 are sharper, so the light guider 37 and the light blocker 35 are difficultly molded by an injection molding technology.

As described above, the light rays emitted by the light emitter 36 are concentrated by the collecting surface 371a, and the concentrated light rays are transmitted to the first reflector 33, then the first reflector 33 reflects the concentrated light rays to the guiding plate 371, and the reflected light rays are guided to the protruding rib 373 by the refraction bevel 375 to light up the protruding rib 373. In order to reflect the light sources which are scattered onto the outer surface of the outer housing 212 back to the light guider 37 to brighten the luminance of the protruding rib 373, the light emitting unit 30 includes the second reflector 39, the second reflector 39 and the light emitter 36 are disposed at the same plane. Furthermore, the light blocker 35 is mounted around the peripheral surface of the guiding wall 372, the inner end of the contacting portion 351 covers the inner end of the guiding wall 372, the inclination surface 306 of the guiding wall 372 of the light guider 37 is closely attached with the oblique surface 201 of the protruding ring 25b of the outer housing 212, the wedging surface 351a abuts against the oblique surface 201 of the protruding ring 25b of the outer housing 212, and the wedging surface 351a is closely cooperated with the oblique surface 201 of the protruding ring 25b, so the light guiding module 31 of the light emitting unit 30 is completely closed, the light rays from the light emitter 36 are effectively blocked to prevent the light rays from leaking out. As a result, the headphone 100 is with a light-emitting function and a better sealing performance.

What is claimed is:

1. A headphone, comprising:
   an arc-shaped headband;
   a sliding bar slidably arranged at a tail end of the headband;
   a hanger pivotally arranged at a tail end of the sliding bar;
   an earphone unit hanged to the hanger, the earphone unit being fastened to the hanger, the earphone unit including a housing, a sound chamber formed in the housing, a loudspeaker monomer mounted in the sound chamber, and a rigid printed circuit board mounted in the sound chamber, the rigid printed circuit board being connected with the loudspeaker monomer, a peripheral edge of an outer surface of the housing protruding outward to form a protruding ring; and
   a light emitting unit fastened to the housing of the earphone unit, the light emitting unit including a light guiding module fastened to the housing, and a light emitter electrically connected to the rigid printed circuit board, the light guiding module including a light guider which is mounted close to an outer surface of the light emitter, and a light blocker mounted to a periphery of an outer surface of the light guider, the light blocker being formed at an outer periphery of the light guiding module by an embedded injection molding technology, an inner end of the light blocker being provided with a contacting portion which is closely cooperated with the protruding ring, and an inner end of the light guider closely abutting against the protruding ring, light rays from the light emitter being blocked, so the light rays from the light emitter being prevented from leaking;
   wherein an outer surface of the protruding ring slantwise extends outward and away from the light guiding module to form an oblique surface, an innermost surface of the contacting portion of the light blocker is a circular wedging surface, the wedging surface is inclined inward from an inner edge of the wedging surface to an outer edge of the wedging surface, the wedging surface abuts against the oblique surface of the protruding ring.

2. The headphone as claimed in claim 1, wherein the housing includes an outer housing, the outer housing has a fixing structure arranged on an outer surface of the outer housing, the light guiding module is cooperated with the fixing structure, the light guiding module is assembled with the fixing structure, the light guiding module of the light emitting unit includes a light blocking sheet disposed to the outer surface of the light guider, the light guider is mounted between the light blocking sheet and the light emitter, an outer periphery of the light blocking sheet is spaced from an inner periphery of the light blocker to form a light transmitting window between the outer periphery of the light blocking sheet and the inner periphery of the light blocker, the light transmitting window presents a preset pattern.

3. The headphone as claimed in claim 2, wherein the light guider has a circular guiding plate, an annular guiding wall mounted around a peripheral edge of the guiding plate, and a protruding rib protruded outward from the peripheral edge of the guiding plate, the guiding wall is arched outward and extends towards the outer surface of the outer housing, the protruding rib is matched with the light transmitting window, the protruding rib is embedded into the light transmitting window.

4. The headphone as claimed in claim 3, wherein an inner surface of the guiding plate has a collecting surface, a circumferential surface surrounding a periphery of the collecting surface, and a refraction bevel connected with an outer periphery of the circumferential surface, a middle of the inner surface of the guiding plate is recessed opposite to the outer surface of the outer housing to form the collecting surface, the light emitter is corresponding to the collecting surface, the refraction bevel slantwise extends outward from the outer periphery of the circumferential surface, the refraction bevel is inclined outward and towards an extending direction of the protruding rib, the refraction bevel is opposite to the protruding rib.

5. The headphone as claimed in claim 4, wherein a bevel angle of the refraction bevel is formed between the refraction bevel and an extension line of the circumferential surface.

6. The headphone as claimed in claim 5, wherein the bevel angle of the refraction bevel is designed in a range of more than twenty degrees and less than thirty degrees.

7. The headphone as claimed in claim 4, wherein the light emitting unit further includes a first reflector mounted between the guiding plate of the light guider and the light blocking sheet, the collecting surface is opposite to the light blocking sheet and the first reflector, one side of an outer surface of the guiding plate protrudes outward to form a buckling portion, one side of an inner surface of the light blocking sheet is recessed opposite to the light guider to form a buckling groove, the buckling portion of the guiding plate is buckled in the buckling groove of the light blocking sheet, so the first reflector is buckled between the light blocking sheet and the guiding plate of the light guider.

8. The headphone as claimed in claim 7, wherein the light blocking sheet is adhered to the outer surface of the guiding plate by a double-sided adhesive, a middle of the outer surface of the guiding plate is corresponding to the first reflector, the first reflector is mounted on the middle of the outer surface of the guiding plate, the double-sided adhesive is disposed around the first reflector, the buckling portion and the buckling groove are exposed from one side of the double-sided adhesive, the first reflector is fastened between the light blocking sheet and the guiding plate of the light guider.

9. The headphone as claimed in claim 7, wherein the light emitting unit includes a second reflector, the second reflector is mounted between the light guider and the outer housing, the second reflector is formed in a ring shape, the second reflector is corresponding to the circumferential surface.

10. The headphone as claimed in claim 3, wherein the protruding ring projects beyond the outer surface of the outer housing, the oblique surface is gradually inclined inward from an inner edge of the protruding ring to an outer edge of the protruding ring, the light blocker is mounted around a peripheral surface of the guiding wall, an outermost surface of the light blocker is aligned with an outer surface of the protruding rib, an inner end of the contacting portion covers an inner end of the guiding wall, the wedging surface is arranged corresponding to the oblique surface of the protruding ring.

11. The headphone as claimed in claim 10, wherein an innermost surface of the guiding wall is a circular inclination surface, and the inclination surface of the guiding wall is inclined inward from an inner edge of the inclination surface to an outer edge of the inclination surface, the inclination surface of the guiding wall of the light guider is matched with the oblique surface of the protruding ring, the inclination surface of the guiding wall of the light guider is closely attached with the oblique surface of the protruding ring of the outer housing.

12. The headphone as claimed in claim 11, wherein an inclination angle of the inclination surface is formed between a horizontal line and the inclination surface.

13. The headphone as claimed in claim 12, wherein the inclination angle of the inclination surface is designed in a range of more than twenty degrees and less than twenty-five degrees.

14. A headphone, comprising:
a headband;
a hanger arranged at a tail end of the headband;
an earphone unit hanged to the hanger, the earphone unit including a housing, a sound chamber formed in the housing, a loudspeaker monomer mounted in the sound chamber, and a rigid printed circuit board mounted in the sound chamber, the rigid printed circuit board being connected with the loudspeaker monomer; and
a light emitting unit fastened to the housing, the light emitting unit including a light guiding module fastened to the housing, and a light emitter electrically connected to the rigid printed circuit board, the light guiding module including a light guider which is mounted close to the light emitter, and a light blocker mounted to a periphery of an outer surface of the light guider;
wherein the light guider has a guiding plate, and a guiding wall mounted around a peripheral edge of the guiding plate, the guiding wall is arched outward and extends towards the housing, an inner surface of the guiding plate has a collecting surface, a circumferential surface surrounding a periphery of the collecting surface, and a refraction bevel connected with an outer periphery of the circumferential surface, a middle of the inner surface of the guiding plate is recessed opposite to the housing to form the collecting surface, the light emitter is corresponding to the collecting surface, the refraction bevel slantwise extends outward from the outer periphery of the circumferential surface, a minimum distance between an outer surface of the guiding plate and the circumferential surface is larger than a minimum distance between the outer surface of the guiding plate and the refraction bevel, the minimum distance between the outer surface of the guiding plate and the refraction bevel is larger than a minimum distance between the outer surface of the guiding plate and the collecting surface.

15. A headphone, comprising:
an arc-shaped headband;
a sliding bar slidably arranged at a tail end of the headband;
a hanger pivotally arranged at a tail end of the sliding bar;
an earphone unit hanged to the hanger, the earphone unit being fastened to the hanger, the earphone unit including a housing, a sound chamber formed in the housing, a loudspeaker monomer mounted in the sound chamber, and a rigid printed circuit board mounted in the sound chamber, the rigid printed circuit board being connected with the loudspeaker monomer, a peripheral edge of a top end of an outer surface of the housing protruding outward to form a protruding ring; and
a light emitting unit fastened to the housing, the light emitting unit including a light guiding module fastened to the housing, and a light emitter electrically connected to the rigid printed circuit board, the light guiding module including a light guider which is mounted close to an outer surface of the light emitter, and a light blocker mounted to a periphery of an outer surface of the light guider, an inner end of the light blocker being provided with a contacting portion which is closely cooperated with the protruding ring, and an inner end of the light guider closely abutting against the protruding ring, an outer surface of the protruding ring slantwise extending outward and away from the light guiding module to form an oblique surface, the light guider having a circular guiding plate, and an annular guiding wall mounted around a peripheral edge of the guiding plate, an innermost surface of the guiding wall being a circular inclination surface, and the inclination surface of the guiding wall being inclined inward from an inner edge of the inclination surface to an outer edge of the inclination surface, the inclination surface of the guiding wall of the light guider being matched with the oblique surface of the protruding ring, the inclination surface of the guiding wall of the light guider being closely attached with the oblique surface of the protruding ring, an innermost surface of the contacting portion being a circular wedging surface, the wedging surface being inclined inward from an inner edge of the wedging surface to an outer edge of the wedging surface, the wedging surface abutting against the oblique surface of the protruding ring, light rays from the light emitter being blocked, so the light rays from the light emitter being prevented from leaking.

* * * * *